United States Patent
Sinclair et al.

(10) Patent No.: US 8,830,616 B2
(45) Date of Patent: Sep. 9, 2014

(54) MAGNETIC STORAGE DEVICE

(71) Applicant: Varian Semiconductor Equipment Associates, Inc., Gloucester, MA (US)

(72) Inventors: Frank Sinclair, Quincy, MA (US); Alexander C. Kontos, Beverly, MA (US); Rajesh Dorai, Woburn, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 0 days.

(21) Appl. No.: 13/693,152

(22) Filed: Dec. 4, 2012

(65) Prior Publication Data

US 2013/0141818 A1 Jun. 6, 2013

Related U.S. Application Data

(60) Provisional application No. 61/566,885, filed on Dec. 5, 2011.

(51) Int. Cl.
| | |
|---|---|
| G11B 5/02 | (2006.01) |
| G11B 5/127 | (2006.01) |
| G11B 9/00 | (2006.01) |
| G11B 9/14 | (2006.01) |
| G11B 5/74 | (2006.01) |
| G01Q 80/00 | (2010.01) |
| G11B 5/00 | (2006.01) |
| B82Y 10/00 | (2011.01) |

(52) U.S. Cl.
CPC ............. G11B 5/127 (2013.01); G11B 9/1409 (2013.01); G01Q 80/00 (2013.01); G11B 5/746 (2013.01); G11B 5/1278 (2013.01); G11B 5/02 (2013.01); G11B 2005/0002 (2013.01); B82Y 10/00 (2013.01)
USPC .......... 360/55; 360/323; 360/324; 360/324.2; 360/46; 360/39; 369/126

(58) Field of Classification Search
None
See application file for complete search history.

(56) References Cited

U.S. PATENT DOCUMENTS

| | | |
|---|---|---|
| 6,476,386 B1 | 11/2002 | Kirschner et al. |
| 2002/0067581 A1* | 6/2002 | Hiramoto et al. ............. 360/322 |
| 2004/0061979 A1* | 4/2004 | Ho et al. ....................... 360/321 |
| 2004/0114470 A1 | 6/2004 | Kim |

FOREIGN PATENT DOCUMENTS

| | | |
|---|---|---|
| EP | 0348239 A1 | 12/1989 |
| EP | 0551814 A1 | 7/1993 |
| WO | 2007/064540 A2 | 6/2007 |

OTHER PUBLICATIONS

Anonymous, "Spin-Polarized Tunneling Storage Device," IBM Technical Disclosure Bulletin, vol. 30, No. 4, Sep. 1, 1987, p. 1858, New York, NY.
International Search Report and Written Opinion, PCT/US2012/067730, dated Apr. 3, 2013.
Wolf, Stuart A., et al., The Promise of Nanomagnetics and Spintronics for Future Logic and Universal Memory, Proceedings of the IEEE, Dec. 2010, pp. 2155-2168, vol. 98, No. 12, IEEE.

* cited by examiner

*Primary Examiner* — Muhammad N Edun (57) ABSTRACT

A write head for a magnetic storage device includes a writing tip comprising a magnetic material, a write pulse generator configured to generate a write pulse signal comprising a varying voltage bias between the magnetic storage device and the writing tip. The write pulse signal comprising one or more write pulses effective to tunnel electrons from the writing tip to the magnetic storage device. The data stream generator configured to provide a data stream signal to the writing tip where the data stream signal is operative to vary spin polarity in the electrons from a first polarity to a second polarity.

19 Claims, 10 Drawing Sheets

MAGNETIC STORAGE DEVICE

This application claims priority to U.S. provisional patent application No. 61/566,885, filed Dec. 5, 2011 and incorporated by reference herein in its entirety.

FIELD OF THE INVENTION

This disclosure relates to magnetic storage devices, and more particularly to the use of electron tunneling to write data to a magnetic storage media.

BACKGROUND

Magnetic storage devices are a key segment of information technology industries. Early tape drives and hard disk drives are examples of magnetic storage devices. For hard disk drives, the data density of written data bits on the magnetic medium has increased by a factor of more than two million since the first disk drive was applied to data storage. In addition, read/write data rates associated with read/write heads used in disk drives also continue to improve. While read heads can be scaled to smaller and smaller sensing areas, write head technology is becoming a road block to continued miniaturization.

A conventional write head includes a piece of ferrite wrapped in a coil. To write data, the coil is energized and a strong magnetic field forms in a gap between the write head and the magnetic media. The generated magnetic field magnetizes a portion of the magnetic media. To read the data, the read head is positioned above the magnetized portion and transforms the magnetic field into an electrical current. Although effective, conventional write heads limit the data density of written data bits on the magnetic medium. For instance, it becomes increasing difficult to magnetize only a desired portion of the magnetic media without inadvertently impacting adjacent portions as the size of the underlying portions becomes smaller and smaller. Conventional write heads also have complex shapes of ferrite to achieve the magnetic field requirement.

One additional area being explored for write head improvements is heat assisted magnetic recording (HAMR). HAMR magnetically records data on magnetic media using laser thermal assistance to first heat the magnetic media. With hard disk drives, HAMR requires a significant increase in complexity in the write heads with the integration of the laser and a plasmonic waveguide near field transducer to heat a very small area [~20 nanometers (nm) across] of a magnetic media disk that is traveling at high speed (~20 m/s) in a very short time to a relatively high temperature of about 400° C. It is difficult to achieve the required temperature gradients to allow writing to a small enough area. Accordingly, there is a need for a write head apparatus and method that overcomes the above described inadequacies and shortcomings.

SUMMARY

Embodiments involve apparatus and methods for performing write and read operations in a magnetic storage device. In one embodiment, a write head for a magnetic storage device includes a writing tip comprising a magnetic material. The write head further includes a write pulse generator configured to generate a write pulse signal comprising a varying voltage bias between the magnetic storage device and writing tip, where the write pulse signal is effective to tunnel electrons from the writing tip to the magnetic storage device, and a data stream generator that is configured to provide a data stream signal to the writing tip, where the data stream signal is operative to vary spin polarity in the electrons from a first polarity to a second polarity.

In a further embodiment, a method of recording data in a magnetic storage device includes generating a write pulse signal comprising a varying voltage to be applied to the magnetic storage device, where the write pulse signal is effective to provide tunneling electrons to the magnetic storage device, providing a data stream signal operative to vary spin polarity in the tunneling electrons from a first polarity during first periods to a second polarity during second periods, and synchronizing the write pulse signal and data stream signal, wherein the voltage bias of the write pulse signal is effective to tunnel electrons when the electrons have the first polarity during one or more first write operations to write a "zero" bit, and wherein the voltage bias of the write pulse signal is effective to tunnel electrons when the electrons have the second polarity during one or more second write operations to write a "one" bit.

BRIEF DESCRIPTION OF THE DRAWINGS

FIG. 3b illustrates exemplary signals that may be generated by the embodiment of FIG. 3a;

FIGS. 4a to 4c are schematic diagrams of electron tunneling further illustrating operation of the write head embodiments of FIGS. 2a and 3a;

DETAILED DESCRIPTION

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
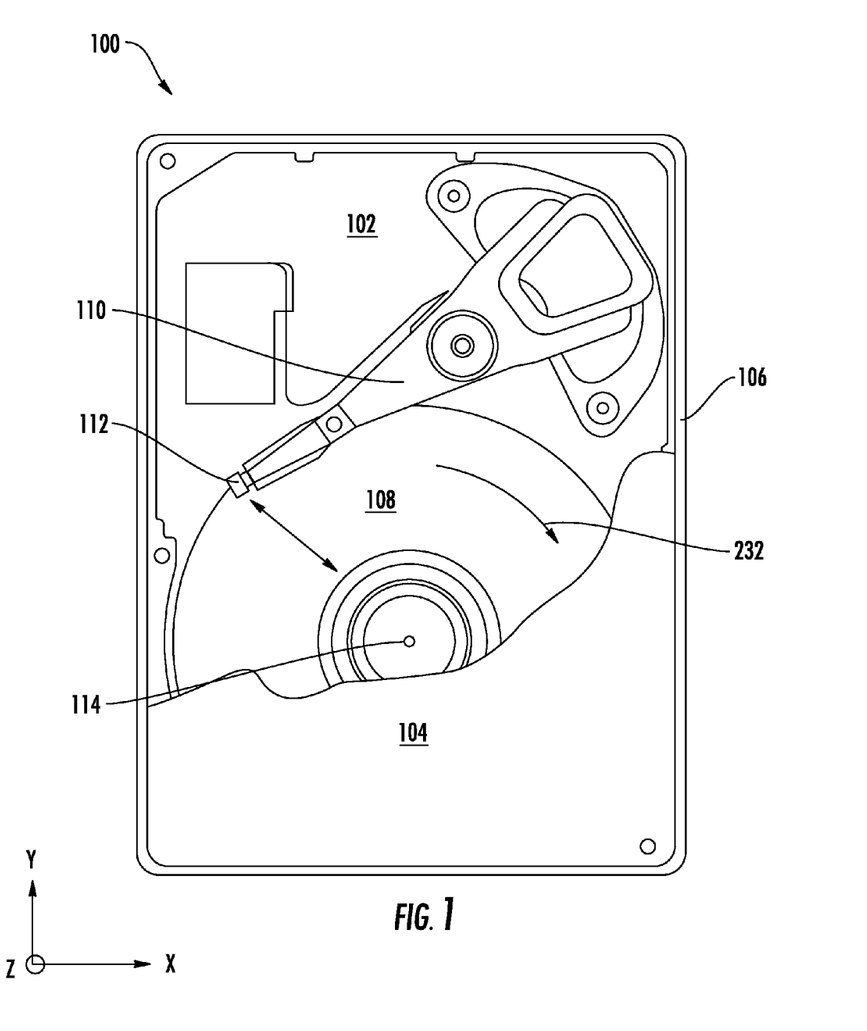
FIG. 1 is a schematic diagram of a hard disk drive.

The present embodiments are generally related to magnetic storage devices and techniques for storing data in magnetic storage media. In particular, the present embodiments are related to hard disk drives and magnetic data disks that comprise magnetic storage media within a hard disk drive. Turning to FIG. 1, a schematic diagram of a hard disk drive 100 is illustrated. The hard disk drive 100 is illustrated in plan view in an X-Y plane of the Cartesian coordinate system shown. The hard disk drive 100 includes a base 102 and a cover 104 shown partially cut away. The base 102 and the cover 104 together combine to form the housing 106 of the hard disk drive 100. The hard disk drive 100 includes one or more rotatable magnetic media, herein referred to as a magnetic data disk 108. The magnetic data disk 108 may store information as magnetically oriented regions that each may represent a single bit. Although only one magnetic data disk 108 is illustrated, multiple disks may be present. The magnetic data disk 108 is coupled to a spindle 114, which operates to rotate the magnetic data disk 108 about a central axis. An actuator arm 110 includes a read/write head 112 consistent with a present embodiment of the disclosure. The actuator arm 110 positions the read/write head 112 at a desired location above the magnetic data disk 108.

Advantageously, the read/write head 112 consistent with the disclosure includes at least a write head that generates electrons for electron tunneling to discrete regions of the magnetic data disk 108. The discrete regions each represent a bit of data, with one magnetic orientation representing a "0" and a substantially opposite magnetic orientation representing a "1." The read/write head 112 may also include a read head that is capable of detecting the magnetic fields of the discrete magnetic regions to differentiate the magnetic orientation representing a "0" from the magnetic orientation representing a "1."

Figure 2A:
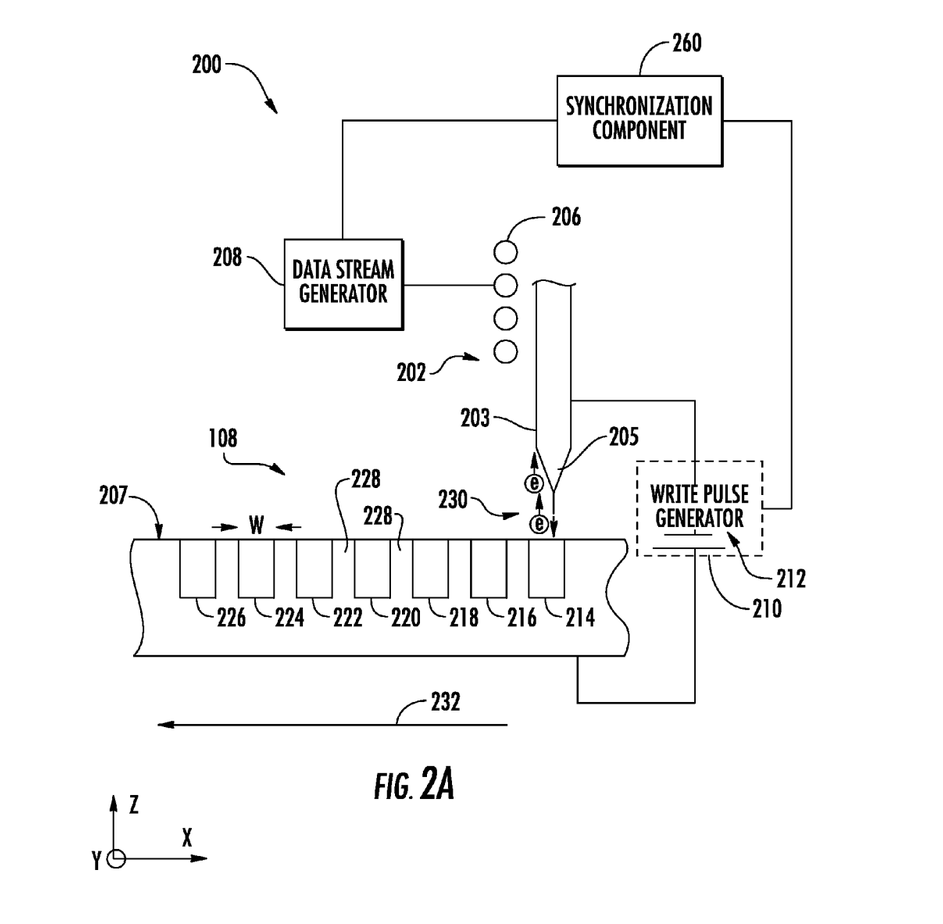
FIG. 2a is a schematic diagram of one write head embodiment that may be used with the hard disk drive of FIG. 1.

FIG. 2a is a schematic diagram illustrating a write head assembly 200 including a write head 202 consistent with the present disclosure. In general, the write head 202 provides electrons for electron tunneling to discrete regions (hereinafter referred to as "magnetic regions") of the magnetic data disk 108. The write head may include a writing member 203 that includes a writing tip 205. The writing tip 205 may be a sharp point somewhat similar to the sharp point of at atomic force microscope. In some examples, the writing tip 205 may be formed according to known techniques for forming probes such as atomic force microscope probes, scanning tunneling probes, magnetic force microscope probes, or similar probes (herein referred to collectively as "scanning probes"). In general, the write head 202 is configured to write data into the magnetic data disk 108 by providing tunneling electrons having a high degree of polarization during each write operation that writes a bit of information into a region in the magnetic data disk 108.

In various embodiments, the write head 202 is configured to perform perpendicular recording of information into magnetic data disk 108 in which the direction of magnetization of a magnetic region 214-226 is perpendicular to the surface 207 of the magnetic data disk 108. As detailed below, during a write operation, electrons of a single spin polarity may be generated by writing shaft 203 which exit in a region of the writing tip 205 and tunnel into the magnetic data disk 108. The term "spin polarity" as used herein refers to a sense of the quantum mechanical spin of an electron, which may be termed either "spin up" or "spin down" or simply "up" or "down." When sufficient electrons of a given spin polarity tunnel into a local region of the magnetic data disk 108, the local region may align according to the spin of the tunneling electrons. Thus, consistent with various embodiments of the disclosure, in a single write operation to generate a single bit, the writing tip 205 may be sufficiently magnetized so that the majority of electrons tunneling from the write head 202 into the magnetic data disk 108 have the same spin.

In some examples, the writing tip 205 has a curved surface that may be described by a radius. In some examples, the radius dimension of the writing tip 205 may be between one nanometer and thirty nanometers. The radius dimension for writing tip 205 may be designed, for example, according to the dimension of a magnetic region corresponding to a bit to be written. Although not depicted in FIG. 2a, the write head assembly 200 may include conventional components used in scanning probes to align the writing tip 205 above the surface 207. For example, the write head assembly 200 may include piezoelectric or other components to maintain a separation between writing tip 205 and the surface 207 at a desired distance, which typically may be on the order of one nanometer or less.

As further shown in FIG. 2a, the write head assembly 200 includes a data stream generator 208 that is configured to provide a data stream signal (detailed below with respect to FIGS. 3b,3c) to the write coil 206 representative of the desired bit stream to write. The write head assembly 200 also includes a write pulse generator 210. As shown in the embodiment of FIG. 2, the write head assembly 200 may include a power supply 212 electrically coupled between the writing member 203 and the magnetic data disk 108. Although not explicitly shown, the write head assembly 200 may also include a return yoke proximate the write coil 206 to provide a return path for magnetic field generated by the writing member 203.

Figure 2B:
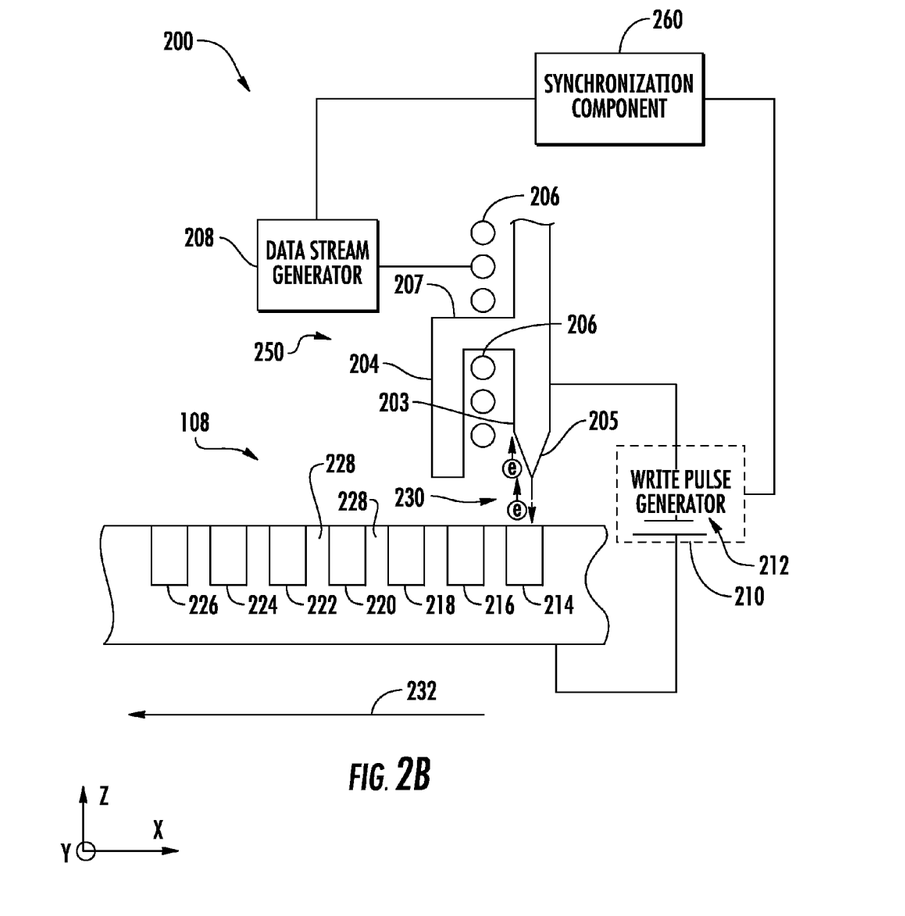
FIG. 2b is a schematic diagram of another write head embodiment that may be used with the hard disk drive of FIG. 1.

FIG. 2b provides details of an embodiment of the write head assembly 200 in which a write head 250 includes a return yoke 204 that is adapted to have a write coil 252 wrapped around at least a portion of the return yoke 204. As illustrated, in this embodiment, the return yoke 204 includes an arm 207 around which the write coil 206 is wrapped. A writing tip 205 is disposed on a distal end of a writing member 203. In operation, the data stream generator 208 provides a data stream signal representative of the desired bit stream to write, for example a binary string of "0"s and "1"s, to the write coil 206. The write pulse generator 210 provides a write bias signal sufficient to tunnel electrons 230 from the writing tip 205 to the underlying magnetic region (e.g., magnetic domain region) of the magnetic data disk 108. A series of short current bursts tunnels the electrons 230 from the writing tip 205 to the magnetic region in the magnetic data disk 108 directly beneath the writing tip 205. The spin polarity of these electrons 230 (illustrated in FIGS. 2a and 2b a first or "up" polarity) can be determined by the direction of magnetization of the writing tip 205. This, in turn, may be controlled by the data stream signal provided to the write coil 206 by the data stream generator 208.

Good electrical contact with the spinning magnetic data disk 108 is necessary to ensure the write pulse generator 210 provides sufficient voltage for electron tunneling from the writing tip 205 to one of the underlying magnetic regions 214, 216, 218, 220, 222, 224, 226. Good electrical contact may be made with an ohmic contact made through a support bearing (not illustrated) of the magnetic data disk 108. The magnetic data disk 108 may be made out of glass, but typically has a metal coating that makes a sufficiently good conductor. Alternatively, good electrical contact made my made using capacitive coupling (non-contact) as the write pulse frequency may be high (e.g., greater than 10 MHz) and thus the capacitance required may be small.

In the embodiments generally illustrated in FIGS. 2a and 2b, the magnetic region 214-226 may constitute small magnetic regions that are isolated from one another by regions 228. In some embodiments the regions 228 may be non-magnetic regions, such as an insulator. Referring also to FIG. 1 during a write operation, the magnetic disk 108 may move along the path 232 with respect to the writing tip 205 to perform a series of write operations to one or more of the magnetic regions 214-226. When the writing tip 105 is proximate a given magnetic region, such as magnetic region 214, a write pulse and data stream signal may be generated to write information into the domain. As viewed in plan view of FIG. 1, the path 232 defines an arc within the X-Y plane illustrated. As viewed in FIGS. 2a and 2b, which shows a perspective of the magnetic data disk 108 in the X-Z plane, the path 232 may be approximated by a line over a short distance represented in the Figures. In embodiments in which the width W of a magnetic region 214-226 is about 1-100 nm, the distance between adjacent features may be a similar value. During writing, for an exemplary rotation speed of the magnetic data disk 108 in the range of thousands of revolutions per minute (rpm), the duration of an individual write operation may be on the order of one nanosecond to tens of nanoseconds in some embodiments. The same applies for the interval between write operations.

Figure 3A:
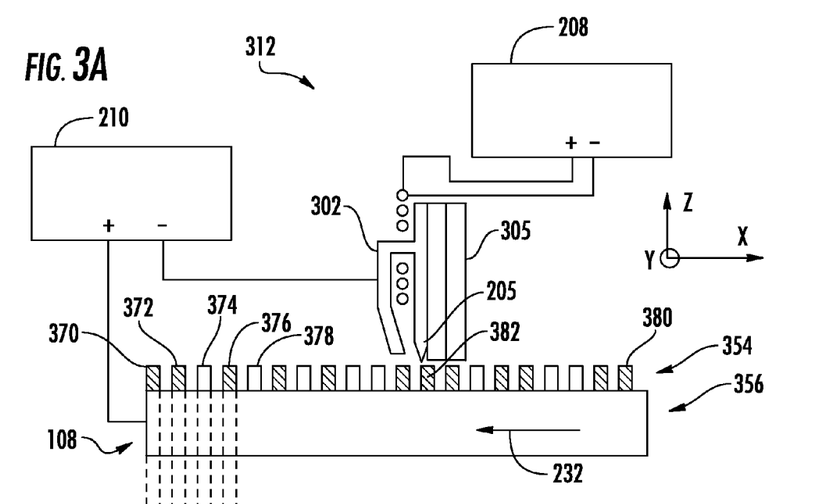
FIG. 3a is a schematic diagram of another write head embodiment that may be used with the hard disk drive of FIG. 1.

Turning to FIG. 3a, a schematic diagram of a read/write head 312 that may be used as the read/write head 112 of the hard disk drive 100 of FIG. 1 is illustrated. The read/write head 312 includes a write head 302 and a read head 305 that may be a giant magnetoresistance (GMR) head. Components of the write head 302 similar to the write head 250 of FIG. 2b are labeled similarly and hence any repetitive description is omitted. In the embodiment of FIG. 3a, the spinning magnetic data disk 108 may include a plurality of magnetic structures 354, which are disposed about a magnetically soft underlayer 356. Similarly to the embodiments of FIG. 2a, the width of the magnetic structures 354 and separation between adjacent bits may be about one nanometer to about thirty nanometers. Writing of information to the magnetic structures 354 is carried out using a combination of signals generated by the write pulse generator 210 and data stream generator 208.

Figure 3B:
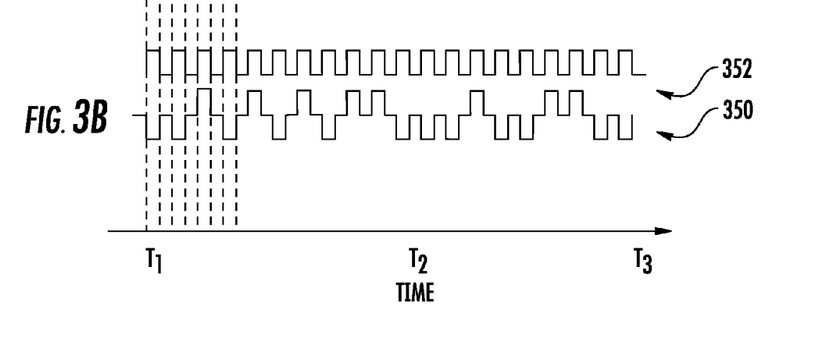

As shown in FIG. 3b, the write pulse generator 210 is operative to output a write bias signal 352, which represents a voltage waveform. The "−" output of the write pulse generator 210 is coupled to the return yoke 204 while the "+" output is coupled to the spinning magnetic data disk 108. Good electrical contact from the "+" output of the write pulse generator 210 may be made with an ohmic contact to a conductive portion (e.g., a metal coating) of the magnetic data disk 108. Alternatively, good electrical contact may be made using capacitive coupling (non-contact) from the "+" output of the write pulse generator 210 to the magnetic data disk 108 as the write pulse frequency may be high (e.g., greater than 10 MHz) and thus the capacitance required may be small.

Figure 3C:
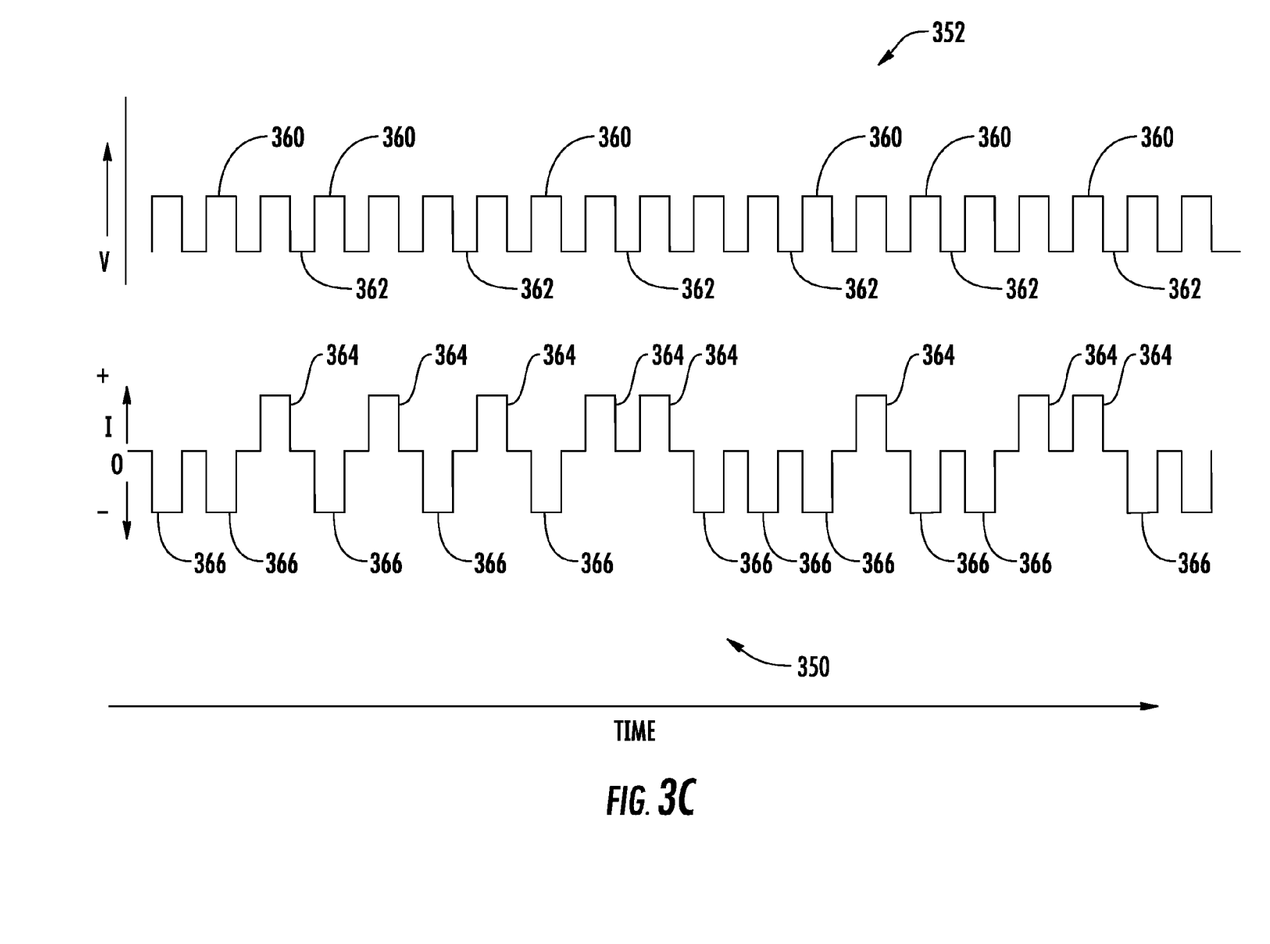
FIG. 3c illustrates details of exemplary signals of FIG. 3b.

As further shown in FIG. 3b, the data stream generator 208 is operative to output the data stream signal 350, which may overlap in time with the write bias signal 352. Turning to FIG. 3c there are shown more details of the write bias signal 352 and data stream signal 350. The write bias signal 352 comprises a set of pulses 360 in which a voltage level is increased to a value that is effective in tunneling electrons from the write head 302 to the magnetic data disk 308 when the write head 302 is positioned at the appropriate separation from the magnetic data disk 308. The pulses 360 are separated by intervals 362 in which the voltage level is such that tunneling does not take place or is reduced between the write head 302 and magnetic data disk 308. The data stream signal 350 contains a series of pulses 364 in a first direction and a series of pulses 366 in a second direction. Thus, pulses may represent the direction of current in a coil used to magnetize the write head 302. Thus, the pulses 364 may represent current pulses in a "+" direction while pulses 366 represent current pulses in a "−" direction. It is to be noted that the conventions "+" and "−" are used merely for convenience in this context to indicate current that travels in two opposite directions. In this manner, the pulses 364, 366 may generate pulses of changing magnetization direction at the tip of write head 302, such that electrons tunneling from the tip of the write head 302 assume a first polarization during pulses 364 and assume a second polarization opposite the first polarization during pulses 366.

Thus, in operation, during writing of desired data to the magnetic data disk 108, the data stream generator 208 provides the data stream signal 350 to the write coil 206 that is representative of a bit stream corresponding to the desired data to write, e.g., a binary string of "0"s and "1"s. As noted above, the write pulse generator 210 provides a write bias (voltage) signal 352 between the return yoke 204 and the spinning magnetic data disk 108 of a sufficient voltage to tunnel electrons from the writing tip 205 to the underlying magnetic structures 354 while the magnetic data disk 108 moves along the path 232 with respect to the write head 302. During a write operation, the writing tip 205 may be magnetized close to its saturation so that the electrons that tunnel across to the underlying magnetic structures 354 have a high polarization. Consistent with the present embodiments, the magnetically soft underlayer 356 and the return yoke 204 help to achieve this field requirement.

In the write process scenario specifically depicted in FIGS. 3a-3c, information is written to the magnetic data disk 108 over a period spanning the duration between times $T_1$ to $T_3$. During this time, the magnetic data disk 108 travels along the path 232 with respect to the write head 302. Information may be written to a given magnetic structure of the magnetic structures 354 at the time when that magnetic structure is positioned under the write head 302. Thus, at time $T_1$, information may be written to magnetic structure 372, while at time $T_3$ information may be written to magnetic structure 380. The arrangement depicted specifically in FIG. 3a corresponds to the position of write head 302 at the time $T_2$ shown in FIG. 3b. At this instance, the write head 302 is proximate the magnetic structure 382. As shown in FIGS. 3a and 3b information is written to each magnetic structure of the magnetic structures, with the unshaded magnetic structures representing a first logical state and the shaded magnetic structures representing a second logical state.

The data stream signal 350 corresponds to a pulse 366 when the write head writes information to the magnetic structure 370. At the same time, the write bias signal 352 is in a "high" state when the writing tip 205 is positioned above the magnetic structure 370 to provide enough voltage for electron tunneling to take place from the writing tip 205 to the magnetic structure 370. As noted, the spin polarization of the tunneling electrons is dependent on the direction of magnetization of the writing tip 205, which is controlled by the data stream signal 350. For the magnetic structure 370, the pulse 366 (see FIG. 3c) of the data stream signal 350 that takes place during writing of the data stream signal 350 is representative of a first spin polarization. The magnetic structure 372 is also subjected to a pulse 366 during the write operation to write information to the magnetic structure 372. The spin polarization for the subsequent magnetic structure 374 is reversed to provide a spin polarization associated with a "1" logical state. This is accomplished by subjecting the magnetic structure 374 to a pulse 364 of the data stream signal 350 during writing of information to magnetic structure 374. Each magnetic structure of the magnetic structures 354 is subsequently subjected to a write operation in which a pulse 360 of the write bias signal 352 is generated concurrently with a pulse 364 of the data stream signal 350 to write a logical "1" to that magnetic structure (see, e.g., magnetic structure 378), or a pulse 366 to write a logical "0" to that magnetic structure (see, e.g., magnetic structure 376). In order to properly align the data stream signal 350 with the write bias signal 352, the write head assembly 200 is provided with a synchronization component 260. The synchronization component 260 may constitute circuitry that is coupled to both the data stream generator 208 and write pulse generator 210 so that periods of high bias pulses of waveforms generated by the write pulse generator 210 are aligned to pulses of the waveforms of the data stream generator 208, as illustrated in FIG. 3c, for example.

In addition to aligning the timing of pulses in the data stream signal 350 and write bias signal 352, the synchronization component 260 may align the position of the magnetic data disk 108 with the data stream signal 350 and write bias signal 352 so that a magnetic structure is disposed under the writing tip 205 during a pulse 360. In this manner, the spin polarized electrons generated by the writing tip 205 are more likely to tunnel into the desired magnetic structure to be written.

It is to be noted that in the example of FIGS. 3a to 3c, information is written to each magnetic structure of the magnetic structures 354. However, in some instances, information need not be written to each magnetic structure of the magnetic structures 354. For example, the write bias signal 352 may be maintained at the voltage level of the intervals 362 when the writing tip 205 passes over a given magnetic structure for which information is not to be written.

Figures 4A, 4B:
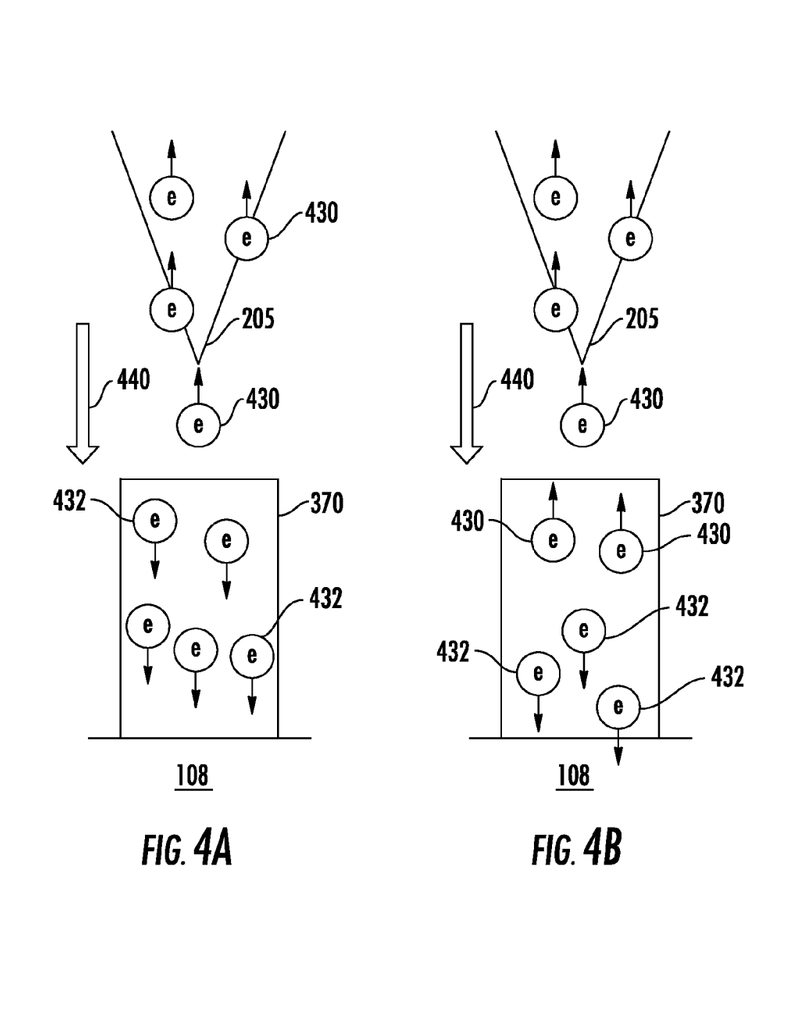
Figure 4C:
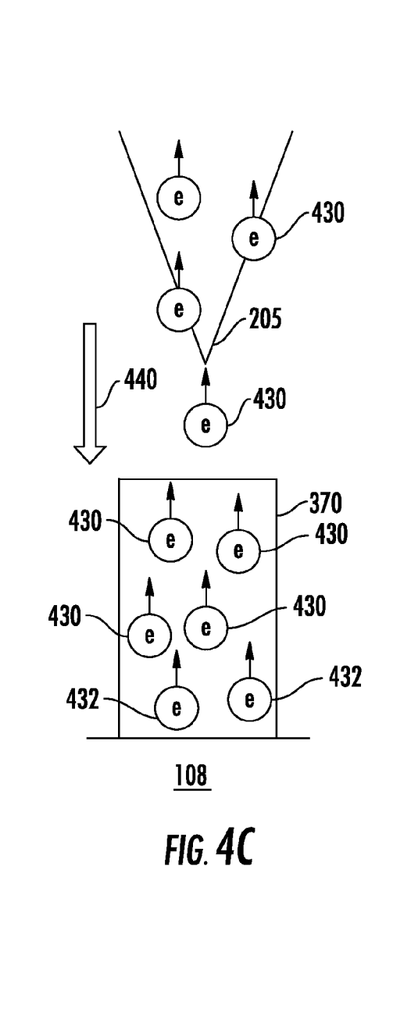

Turning to FIGS. 4a-4c, an exploded view of the writing tip 205 and one magnetic structure 370 are shown over time. In particular the progression illustrated in FIGS. 4a to 4c represents one example of application of a data write operation consistent with the present embodiments. In the scenario illustrated in FIG. 4a the spin polarization of electrons 430 emanating from the writing tip 205 is in a first or "up" state. The spin polarization of electrons 432 currently residing in the magnetic structure 370 is of a second substantially opposite or "down" polarity. However, the scenario of FIG. 4a may correspond to the state of data stream signal 350 and write bias signal 352 at time $T_1$ shown in FIG. 3b. As noted above, the data stream signal 350 provides a pulse 366 to provide a first polarization of electrons within the writing tip 205, which may correspond to the "up" state. At the same time, the pulse 360 of the write bias signal 352 provides sufficient voltage difference between the writing tip 205 and magnetic data disk 108 so that electrons 230 at the edge of the writing tip 205 may tunnel from the writing tip 205 to the magnetic structure 370 in the direction of current 440.

FIG. 4b illustrates the situation at an instant in time subsequent to that shown in FIG. 4a. As the tunneling electrons, that is, electrons 430, continue to bombard the magnetic structure 370, the electrons 430 having "up" polarity begin to accumulate in the upper region of the magnetic structure 370 and push out the "down" polarity electrons, that is, electrons 432. Eventually, as illustrated in FIG. 4C, the "up" electrons, that is, electrons 430, which arose from electrons generated by the writing tip 205, may outnumber the originally "down" electrons, that is, electrons 432. Moreover, when sufficient "up" electrons populate the magnetic structure 370, any originally "down" electrons may flip their polarization state to "up." This is illustrated by the remaining electrons 432 in FIG. 4c, whose polarization state is now "up."

Although the read head 305 is illustrated as a convention GMR read head in FIG. 3, in other embodiments a read head may be provided with a reading tip having a sharp point similar to the writing tip 205. This facilitates the ability to read data from a magnetic data disk by employing tunneling of spin polarized electrons from magnetic data structures, where each magnetic data structure may represent a single bit of information. Once the spin polarized electrons are tunneled from the bit to be read in the magnetic data disk to the read head, the spin polarized electrons may generate a signal in the read head that is read in a conventional manner in order to determine the polarity of the magnetic structure being read, and thereby the logical state of the bit.

Figure 5:
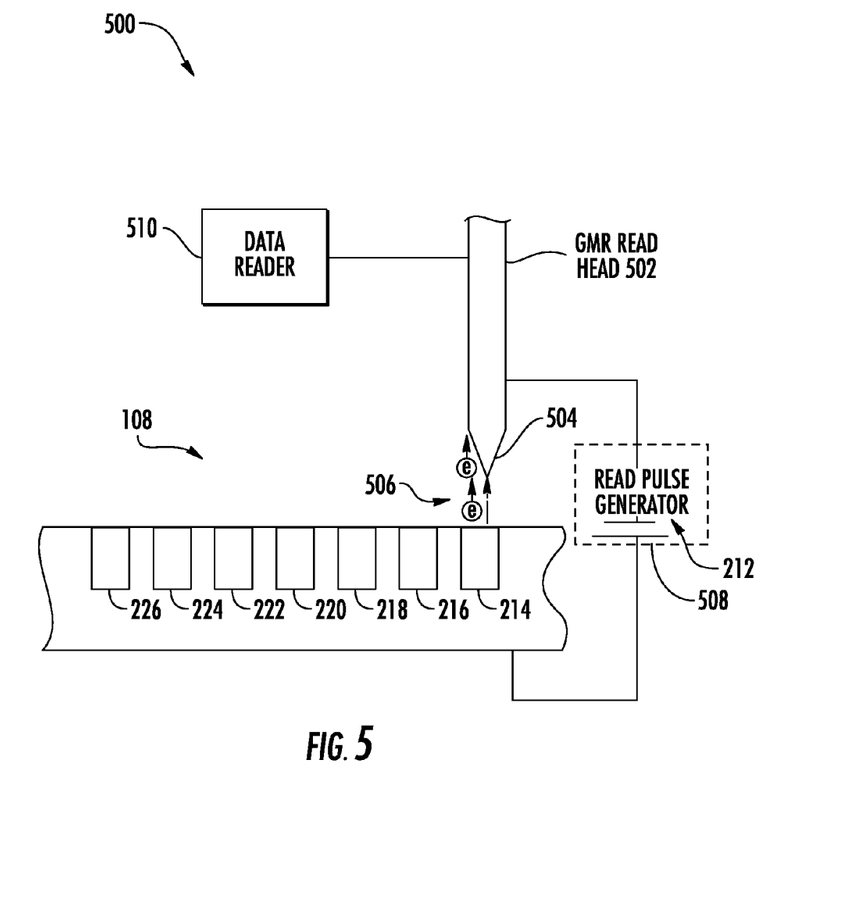
FIG. 5 depicts an embodiment of a read head.

Spin polarized electrons from the patterned magnetic structures may be tunneled into the sensing volume of the read head. This would require reversing polarity of the write pulse generator 210 to produce "read pulses." FIG. 5 depicts an embodiment of a read head assembly 500 consistent with further embodiments, in which reading of a magnetic data disk 108 is carried out by electron tunneling. In the example shown, a read head 502 includes a read tip 504, which may have a shape and size similar to that of the writing tip 205 described above. In particular, the read tip 504 is configured to attract electrons that may tunnel from the magnetic data disk 108. In the scenario of FIG. 5, spin polarized electrons 506 tunnel from the magnetic region 214 when a read pulse generator 508 generates a voltage pulse that establishes sufficient voltage bias between the magnetic data disk and read tip 504. Once the spin polarized electrons 506 populate the read tip 504, the polarization of the spin polarized electrons 506 is then determined by the data reader 510, which may determine the magnetization direction of the read tip 504 according to conventional techniques. In this manner, the logical state of the magnetic structure is determined.

Figure 6A:
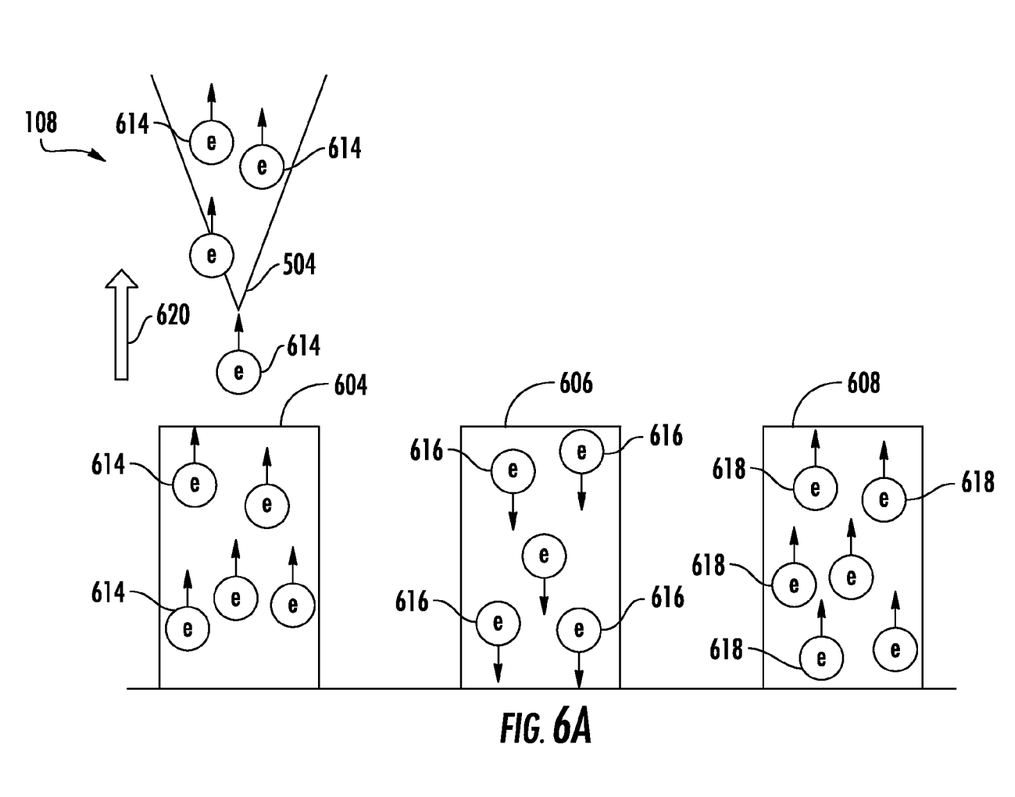
FIGS. 6a to 6c depict one embodiment of reading a hard disk drive using the embodiment of FIG. 5.
Figure 6B:
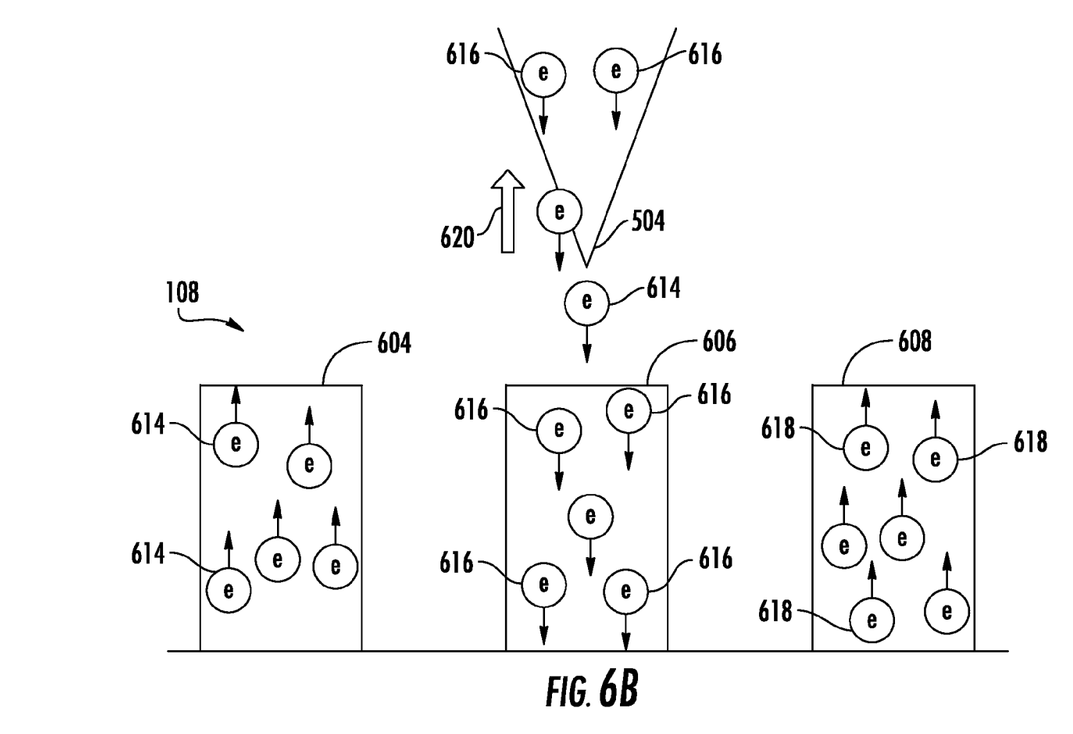
Figure 6C:
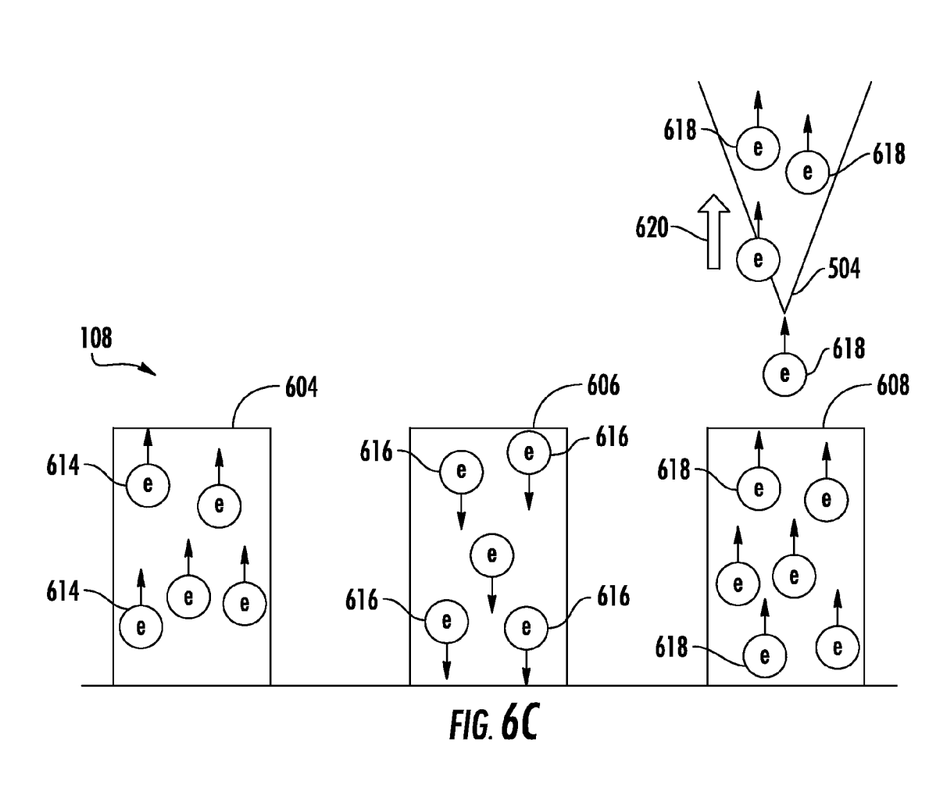

FIG. 6a depict details of a scenario for reading a portion of the magnetic data disk 108 using the read head assembly 500 of FIG. 5. In FIG. 6a, the read tip 504 is disposed over a magnetic structure 604 that includes electrons 614 that are polarized in a spin "up" state corresponding to a first logical state. The electrons 614 tunnel in the direction of current 620 into the read tip 504 and may be read by the data reader 520 to determine that magnetic structure 604 is in logical "1" in one instance. In FIG. 6b, the read tip 504 is disposed over a magnetic structure 606 that includes electrons 616 that are polarized in a spin "down" state corresponding to a second logical state. The electrons 616 tunnel into the read tip 504 and may be read by the data reader 520 to determine that magnetic structure 606 is in logical "0" in one instance. In FIG. 6c, the read tip 504 is disposed over a magnetic structure 608 that includes electrons 618 that are polarized in a spin "up" state corresponding to the first logical state. The electrons 618 tunnel into the read tip 504 and may be read by the data reader 520 to determine that magnetic structure 608 is in logical "1" in one instance.

The concept of tunneling electrons that exploits the polarity spin of electrons may be referred to as spintronics. There has thus been provided a spintronic hard disk drive having a write head that uses electron tunneling to conduct a spin polarized tunneling current to an underlying portion of magnetic media such as a spinning magnetic media disk. In contrast to conventional write heads that use a magnetic field to change a magnetic property of an underlying portion of magnetic media, the use of electron tunneling can be effectively controlled to influence a small area of the magnetic media or magnetic domain since electrons can be particularly directed from the writing tip. This facilitates reductions in sizes of the effected underlying magnetic regions or structures to further facilitate higher data density storage and continued miniaturization of disk drives. As the size of the magnetic domains or structures used to store a bit of data continues to shrink, the number of tunneling electrons necessary to effect a change in magnetization will also be reduced. Hence the amplitude of the write pulse signal may also be decreased. Also, complex write head shapes of conventional write heads that use a magnetic field can be avoided.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A write head for a magnetic storage device comprising:
a writing tip comprising a magnetic material;
a write pulse generator configured to generate a write pulse signal comprising a varying voltage bias between the magnetic storage device and the writing tip, the write pulse signal including a plurality of write pulses effective to tunnel electrons from the writing tip to the magnetic storage device;
a data stream generator configured to provide a data stream signal to the writing tip, the data stream signal operative to vary spin polarity in the electrons from a first polarity to a second polarity, wherein the data stream signal comprises a plurality of pulses, wherein the write pulse signal and data stream signal are interoperative to generate a plurality of write operations.

2. The write head of claim 1, further comprising:
an electrically conductive writing member connected to the writing tip; and
a writing coil disposed proximate the electrically conductive writing member and coupled to the data stream generator, the data stream signal operative to vary a current direction within the writing coil from a first current direction to a second current direction opposite the first direction.

3. The write head of claim 2, wherein the first current direction is configured to generate first electrons at the writing tip having the first spin polarity, and the second current direction configured to generate second electrons at the writing tip having the second spin polarity.

4. The write head of claim 1, wherein the writing tip comprising a radius of about one nanometer to about thirty nanometers.

5. The write head of claim 1, wherein the write pulse generator having a first terminal electrically coupled to the writing tip and a second terminal electrically coupled to the magnetic storage device.

6. The write head of claim 5, wherein the write pulse generator is configured to generate a field operative to tunnel the electrons from the writing tip to the magnetic storage device when the writing tip is within a predetermined distance from a surface of the magnetic storage device.

7. The write head of claim 1, further comprising a synchronization component coupled to the data stream generator and write pulse generator and configured to synchronize the write pulse signal and data stream signal, wherein the plurality of write pulses are aligned with the plurality of pulses of the data stream signal, wherein the voltage bias of the write pulse signal is effective to tunnel electrons when the electrons have the first polarity during one or more first write operations to write a "zero" bit, and wherein the voltage bias of the write pulse signal is effective to tunnel electrons when the electrons have the second polarity during one or more second write operations to write a "one" bit.

8. The write head of claim 7, wherein the synchronization component is further configured to synchronize the write pulse signal and data steam signal with a drive signal for the magnetic storage device, wherein the writing tip is proximate one or more first magnetic regions during the respective one or more first write operations and proximate one or more second magnetic regions during the respective one or more second write operations.

9. A magnetic storage device to store data in a magnetic disk, comprising
a writing tip disposed on a distal end of a writing member;
a write pulse generator configured to provide a write pulse signal between the writing tip and the magnetic disk, the write pulse signal comprising a plurality of write pulses operative to generate tunneling electrons that tunnel from the writing tip to the magnetic disk;
a data stream generator configured to provide a data stream signal to the writing tip as a plurality of pulses, the data stream signal operative to generate first electrons at the writing tip having a first spin polarity during a first set of data stream periods, and to generate second electrons at the writing tip having a second spin polarity during a second set of data stream periods, wherein the first and second data stream periods coincide with respective write pulses.

10. The magnetic storage device of claim 9, further comprising: a writing coil disposed proximate the electrically conductive writing member and coupled to the data stream generator, the data stream signal operative to vary a current direction within the writing coil from a first current direction during the first set of write periods to a second current direction opposite the first direction during the second set of write periods.

11. The magnetic storage device of claim 10, wherein the first current direction is configured to generate first electrons at the writing tip having the first spin polarity, and the second current direction configured to generate second electrons at the writing tip having the second spin polarity.

12. The magnetic storage device of claim 9, wherein the writing tip comprising a radius of about one nanometer to about thirty nanometers.

13. The magnetic storage device of claim 9, wherein the write pulse generator configured to generate a field operative to tunnel the tunneling electrons from the writing tip to the magnetic disk when the writing tip is within a predetermined distance from a surface of the magnetic disk.

14. The magnetic storage device of claim 9, further comprising a synchronization component configured to synchronize the write pulse signal, the data stream signal, a position of the magnetic disk, wherein the writing tip is proximate one or more first magnetic regions of the magnetic disk during respective one or more first data stream periods of the first set of data stream periods and proximate one or more second magnetic regions during respective one or more second data stream periods of the second set of data stream periods, the first magnetic regions comprising regions to store a bit having a first value, and the second magnetic regions comprising regions to store a bit having a second value different from the first value.

15. The magnetic storage device of claim 9, further comprising a read head assembly comprising:
a magnetic read tip;
a read pulse generator configured to provide a read pulse signal between the magnetic read-tip and the magnetic disk, the read pulse signal comprising one or more read periods, each read period of the one or more read periods operative to generate second tunneling electrons that tunnel from the magnetic disk to the read tip; and
a read sensor operative to determine a polarization state of the second tunneling electrons during the one or more read periods.

16. A method of recording data in a magnetic storage device, comprising:

generating a write pulse signal comprising a varying voltage to be applied to the magnetic storage device, the write pulse signal comprising a plurality of write pulses effective to provide tunneling electrons to the magnetic storage device;

providing a data stream signal comprising a plurality of pulses that are operative to vary spin polarity in the tunneling electrons from a first polarity during first periods to a second polarity during second periods; and synchronizing the write pulse signal and data stream signal, wherein the first periods are aligned with respective first write pulses of the plurality of write pulses and the second periods are aligned with respective second write pulses of the plurality of write pulses, wherein the voltage bias of the write pulse signal is effective to tunnel electrons when the electrons have the first polarity during the first periods to write a "zero" bit, and wherein the voltage bias of the write pulse signal is effective to tunnel electrons when the electrons have the second polarity during the second periods to write a "one" bit.

17. The method of claim 16, further comprising, in response to the data stream signal, magnetizing a writing tip to generate the tunneling electrons in a first direction during the first periods, and magnetizing the writing tip in a second direction opposite the first direction during the second periods.

18. The method of claim 16, further comprising positioning a writing tip at a distance proximate the magnetic disk wherein the write pulse signal is effective to generate the tunneling electrons.

19. The method of claim 16, further comprising synchronizing the write pulse signal and data steam signal with a drive signal for the magnetic storage device, wherein the writing tip is proximate one or more first magnetic regions during the respective one or more first write operations and proximate one or more second magnetic regions during the respective one or more second write operations.

* * * * *